United States Patent [19]

Tateno

[11] Patent Number: 5,062,395

[45] Date of Patent: Nov. 5, 1991

[54] TWO-STROKE INTERNAL COMBUSTION ENGINE

[75] Inventor: Manabu Tateno, Susono, Japan

[73] Assignee: Toyota Jidosha Kabushiki Kaisha, Aichi, Japan

[21] Appl. No.: 465,159

[22] PCT Filed: Jun. 29, 1989

[86] PCT No.: PCT/JP89/00650

§ 371 Date: Mar. 30, 1990

§ 102(e) Date: Mar. 30, 1990

[87] PCT Pub. No.: WO90/00222

PCT Pub. Date: Jan. 11, 1990

[30] Foreign Application Priority Data

Jul. 1, 1988 [JP] Japan .................. 63-162399

[51] Int. Cl.$^5$ .............................. F02B 75/02
[52] U.S. Cl. ................... 123/65 VD; 123/73 C; 123/432
[58] Field of Search ............ 123/193 H, 432, 308, 123/65 VD, 73 C, 73 CA

[56] References Cited

U.S. PATENT DOCUMENTS

| 2,522,921 | 9/1950 | Barkeij . | |
|---|---|---|---|
| 4,162,662 | 7/1979 | Melchior | 123/65 VD |
| 4,719,880 | 1/1988 | Schlunke et al. | 123/65 WA |
| 4,771,754 | 9/1988 | Reinke | 123/533 |
| 4,794,901 | 1/1989 | Hong et al. | 123/533 |
| 4,811,708 | 3/1989 | Gruden | 123/302 |
| 4,840,147 | 6/1989 | Tanahashi et al. | 123/65 VD |
| 4,945,867 | 8/1990 | Tanahashi et al. | 123/65 VD |
| 4,957,081 | 9/1990 | Ito et al. | 123/302 |

FOREIGN PATENT DOCUMENTS

| 0249129 | 12/1987 | European Pat. Off. . |
| 0277296 | 8/1988 | European Pat. Off. . |
| 0299385 | 1/1989 | European Pat. Off. . |
| 2338385 | 8/1977 | France . |
| 2589518 | 5/1987 | France . |
| 59-206613 | 11/1984 | Japan . |
| 60-35143 | 2/1985 | Japan . |
| 61-104154 | 5/1986 | Japan . |
| 62-291427 | 12/1987 | Japan . |
| 63-1710 | 1/1988 | Japan . |
| 63-215817 | 9/1988 | Japan . |
| WO87/00575 | 1/1987 | World Int. Prop. O. . |
| WO87/00578 | 1/1987 | World Int. Prop. O. . |
| WO87/00579 | 1/1987 | World Int. Prop. O. . |

Primary Examiner—David A. Okonsky
Attorney, Agent, or Firm—Oliff & Berridge

[57] ABSTRACT

A two-stroke internal combustion engine provided with a masking wall (8a, 40b) which is disposed between an intake valve (6) and exhaust valve (7) disposed on a cylinder head inner wall surface (3a) and which closes the opening between the peripheral edge of the intake valve (6) and valve seat (9) positioned at the exhaust valve (7) side, over the period of full opening of the intake valve (6), and a fuel injection valve (14, 42) which is disposed at the peripheral side portion of the cylinder head inner wall surface (3a) at the intake valve (6) side, wherein the fuel injection from the fuel injection valve (14, 42) to the cylinder (1) is started when the intake valve (6) opens. By this, it is possible to easily ignite the fuel and to stabilize the combustion after ignition.

18 Claims, 10 Drawing Sheets

Fig.7
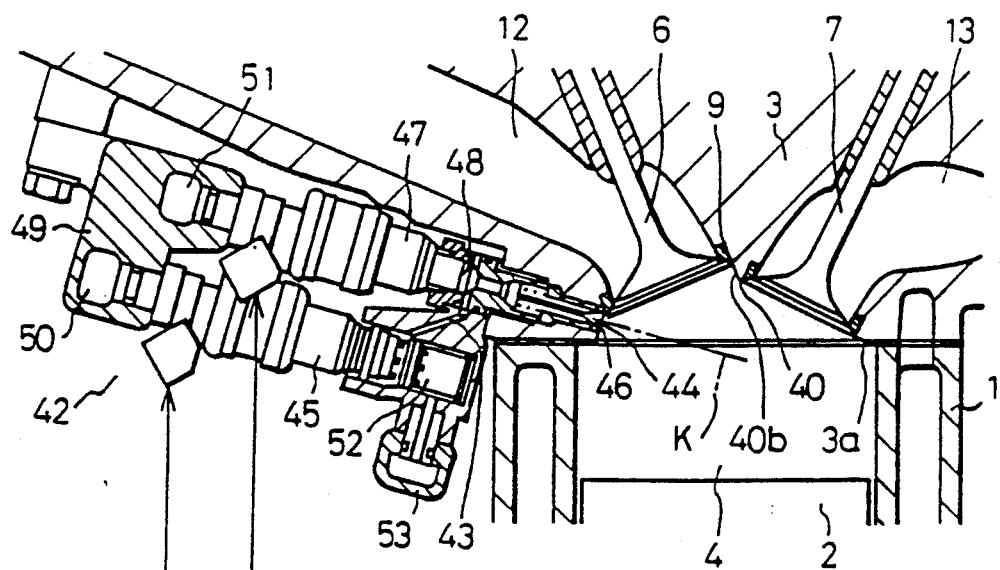
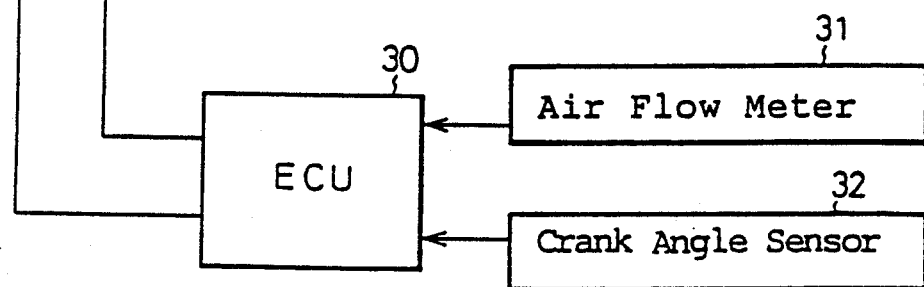

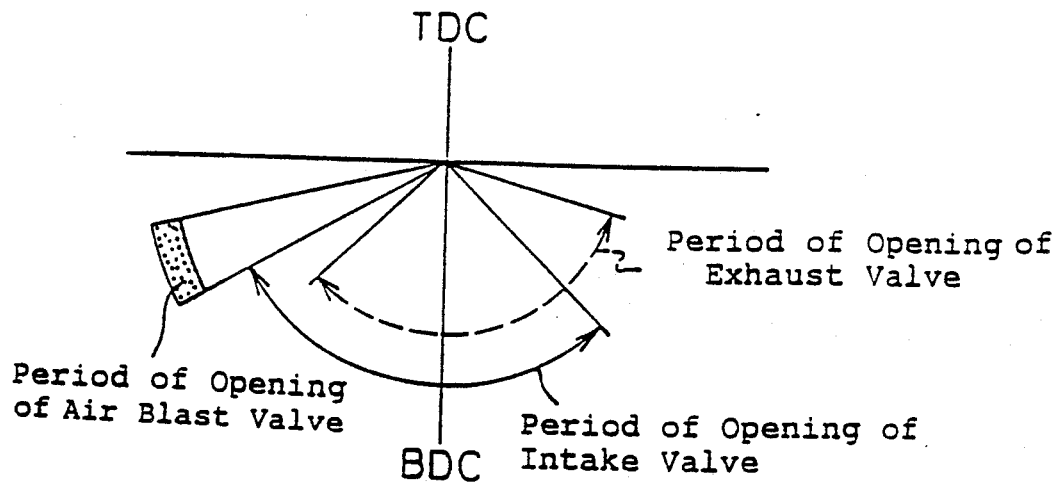
Fig.11 Low Load Operation
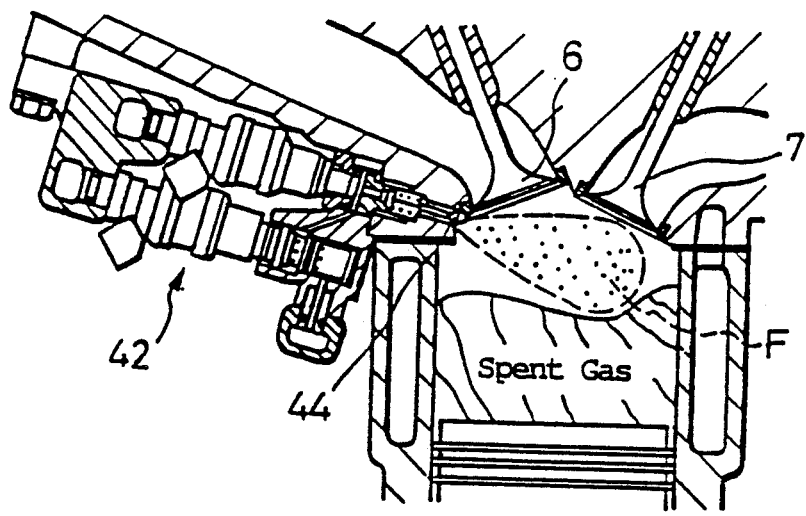
Fig.12 Low Load Operation

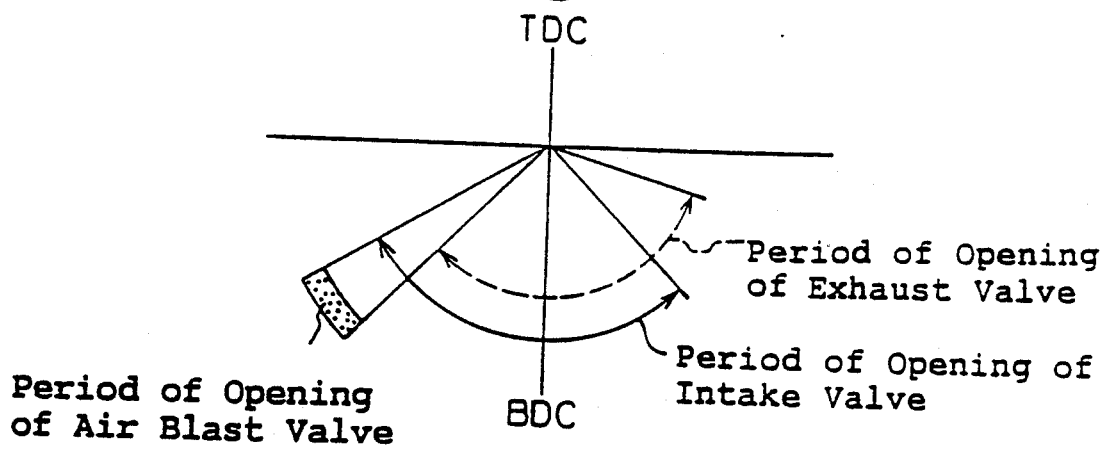
Fig.13 High Load Operation
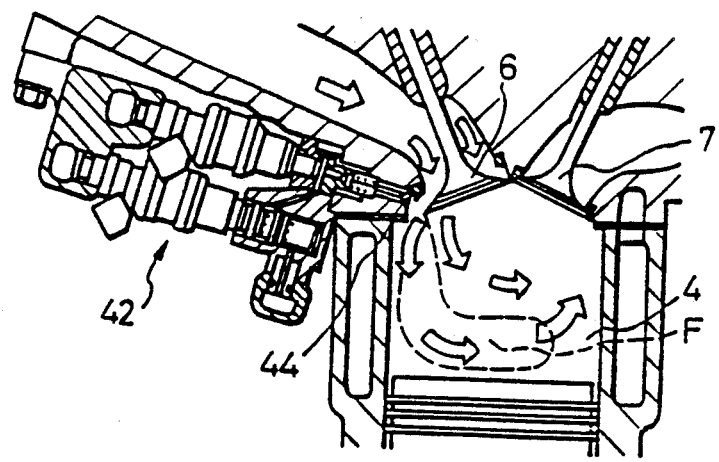
Fig.14 High Load Operation

TWO-STROKE INTERNAL COMBUSTION ENGINE

FIELD OF ART

The present invention relates to a two-stroke internal combustion engine.

BACKGROUND ART

In a two-stroke internal combustion engine, there is a period during which both the intake port and the exhaust port are open. Therefore, the phenomenon occurs in which the fuel supplied in the cylinders is exhausted into the exhaust port in the unburnt state, i.e., so-called "blowby" occurs. When blowby occurs, there are the problems of deterioration of the rate of fuel consumption, an increase in the emission of toxic exhaust, etc., so it is necessary to reduce such blowby. Toward this end, it is possible to provide a fuel injection valve for directly spraying fuel in the cylinder and to delay the fuel injection timing of the fuel injection valve so as to reduce the blowby.

However, in the case of direct injection of fuel into a cylinder, it is not possible to sufficiently disperse and atomize the fuel by the flow of intake air as in the case of injecting fuel into an intake port. Further, if the fuel injection timing is delayed, as the time from the injection of the fuel to the ignition becomes shorter, it is not possible to vaporize the fuel sufficiently. Therefore, there is the problem that good ignition and combustion cannot be obtained.

As a countermeasure, Japanese National Publication (Tokuhyo) No. 63-50032 discloses a two-stroke internal combustion engine which has an intake port and exhaust port on the inner peripheral side surface of the cylinder to enable direct injection of fuel in the cylinder, said two-stroke internal combustion engine injecting into the cylinder at least 80 percent of the amount of fuel injection before the closing of the exhaust port during high load engine operation so as to improve the dispersion and atomization of fuel in high load engine operation.

However, such a two-stroke internal combustion engine tries to improve the dispersion and atomization of fuel just by lengthening the time from the injection of fuel in the cylinder to its ignition, so the dispersion of the fuel and the atomization and vaporization of the fuel are still insufficient and therefore it is not possible to obtain excellent ignition and combustion.

DISCLOSURE OF THE INVENTION

The object of the present invention is to provide a two-stroke internal combustion engine which enables easy ignition of the fuel and excellent combustion after ignition.

According to the present invention, there is provided a two-stroke internal combustion engine provided with a piston which moves reciprocatively in a cylinder, a cylinder head which has an inner wall surface, at least one intake valve which is arranged on the cylinder head inner wall surface, at least one exhaust valve which is arranged on the cylinder head inner wall surface, a masking means which is arranged between the intake valve and the exhaust valve and closes the opening between the peripheral edge of the intake valve and valve seat positioned at the exhaust valve side, a fuel injection means which is arranged at the peripheral side portion of the cylinder head inner wall of the intake valve side, and a control means which controls the fuel injection from the fuel injection means to the cylinder, the control means starting the fuel injection from the fuel injection means to the cylinder when the intake valve is opening.

BRIEF DESCRIPTION OF THE DRAWINGS

FIG. 7 is a side sectional view of a two-stroke internal combustion engine of a second embodiment of the present invention;

FIG. 11 is a graph of the opening period etc. of the intake and exhaust valves and the air blast valve under low load operation;

FIG. 12 is a view of the state of fuel atomization in a combustion chamber under low load operation;

FIG. 13 is a graph of the opening period etc. of the intake and exhaust valves and the air blast valve under high load operation;

FIG. 14 is a view of the state of fuel atomization in a combustion chamber under high load operation.

BEST MODE FOR CARRYING OUT THE INVENTION

Figure 1:
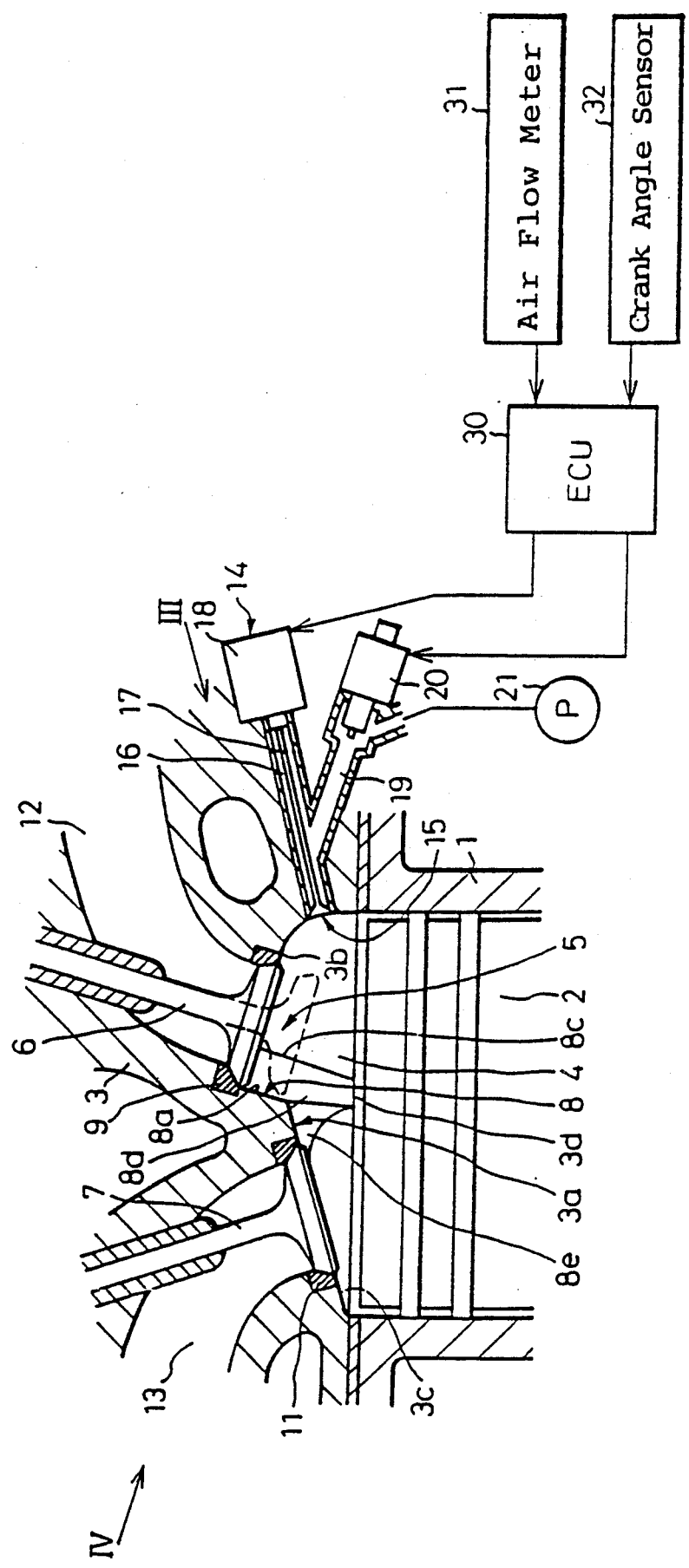
FIG. 1 is a side sectional view of a two-stroke internal combustion engine of a first embodiment of the present invention.
Figure 2:
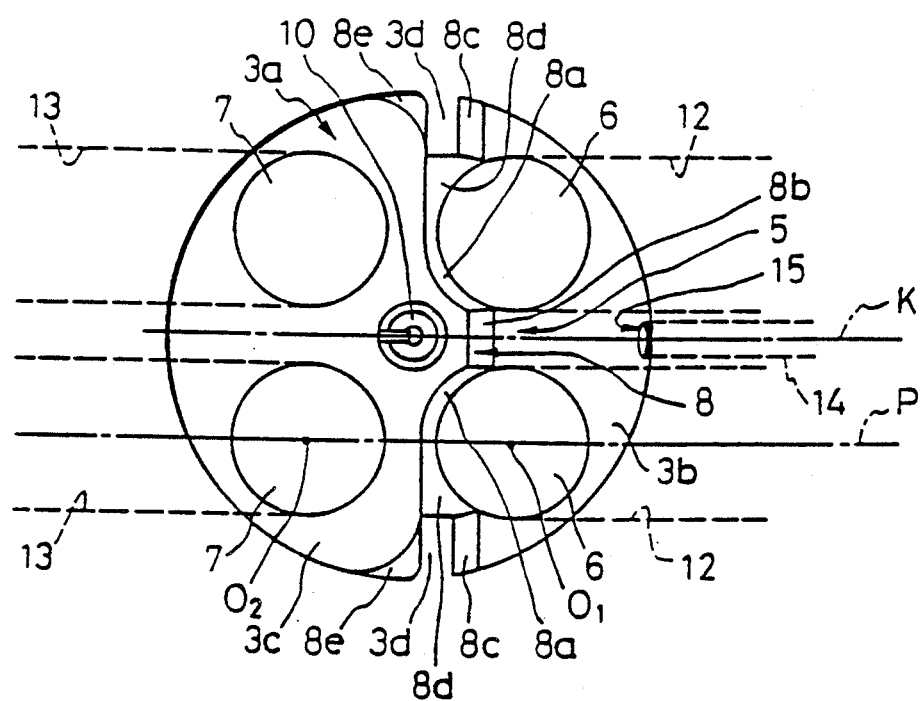
FIG. 2 is a view showing the inner wall surface of the cylinder head of FIG. 1.
Figure 3:
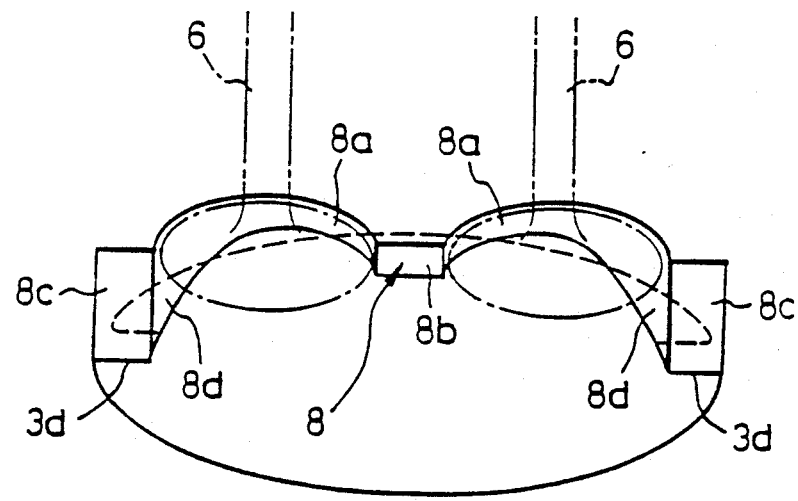
FIG. 3 is a diagrammatic perspective view along the arrow III of FIG. 1.
Figure 4:
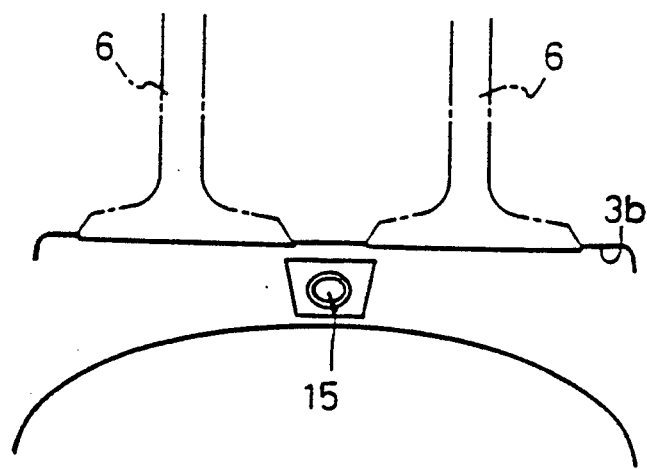
FIG. 4 is a diagrammatic perspective view along the arrow IV of FIG. 1.

An explanation will be made of the first embodiment referring to FIG. 1 to FIG. 4. Referring to FIG. 1 to FIG. 4, 1 is a cylinder block, 2 is a piston moving reciprocatively in the cylinder block 1, 3 is a cylinder head fixed to the cylinder block 1, and 4 is a combustion chamber formed between the inner wall surface 3a of the cylinder head 3 and the top surface of the piston 2. On the inner wall surface 3a of the cylinder head is formed a groove 5, a pair of intake valves 6 being arranged on the inner wall surface portion 3b of the cylinder head forming the bottom wall surface of the groove 5. On the other hand, the cylinder head inner wall surface portion 3c, other than the groove 5, is substantially flat. On the cylinder head inner wall surface portion 3c are disposed a pair of exhaust valves 7 The cylinder head inner wall surface portion 3b and the cylinder head inner wall surface portion 3c are connected to each other through the peripheral wall 8 of the groove 5. This groove peripheral wall 8 is formed by a pair of masking walls 8a extending in arcs along the peripheral edges of the intake valves 6, a fresh air guide wall 8b positioned between the intake valves 6, and a pair of fresh air guide walls 8c positioned between the peripheral edge of the cylinder head inner wall surface 3a and the intake valves 6. The masking walls 8a extend toward the combustion chamber 4 further down than the intake valves 6 at the maximum lift position shown by the broken line in FIG. 1. Therefore, the opening between the peripheral edges of the intake valves 6 and valve seats 9 positioned at the exhaust valve 7 side is closed by the masking walls 8a for the entire period of opening of the intake valves 6. Further, the pair of fresh air guide walls 8c are positioned substantially in the same plane. Still further, the fresh air guide walls 8b and 8c extend substantially in parallel with the line connecting the centers of the two intake valves 6. Also, in the embodiment shown from FIG. 1 to FIG. 4, the pair of fresh air guide walls 8c extend to the bottom wall surface of the cylinder head inner wall surface 3. That is, the bottom wall surface of the cylinder head inner wall surface 3a has a pair of bottom wall surface portions 3d projecting in a U-shape toward the combustion chamber 4, and the fresh air guides 8c extend from the cylinder head inner wall surface portions 3b to these bottom wall surface portions 3d. Therefore, the fresh air guide walls 8c are higher than even the masking walls 8a. On the other hand, the masking walls 8a positioned at the fresh air guide walls 8c have extensions 8d extending up to the bottom wall surface portions 3d, which extensions 8d also form the fresh air guide walls. As will be understood from FIG. 3, the fresh air guide walls 8d curve and extend to the fresh air guide walls 8c, the height of the fresh air guide walls 8d becoming higher the closer to the fresh air guide walls 8c. On the other hand, as shown in FIG. 1 and FIG. 2, spent gas guide walls 8e are formed at the side opposite to the fresh air guide walls 8c. The spent gas guide walls 8e comprise curved surfaces extending from the cylinder head inner wall surface portion 3 to the wall bottom surface portions 3d.

As shown in FIG. 2, a spark plug 10 is disposed on the cylinder head inner wall surface 3c so as to be positioned at the center of the cylinder head inner wall surface 3a. With respect to the exhaust valves 7, no masking walls are provided to cover the openings between the exhaust valves 7 and the valve seats 11. Therefore, when the exhaust valves 7 open, the openings formed between the exhaust valves 7 and the valve seats 11 open as a whole to the inside of the combustion chamber 4.

In the cylinder head 3 is formed intake ports 12 corresponding to the intake valves 6 and exhaust ports 13 corresponding to the exhaust valves 7. Further, at the peripheral side portions of the cylinder head inner wall portion 3b under the pair of intake valves 6 is arranged an air blast valve 14 which injects fuel together with compressed air. This air blast valve 14 is provided at its tip with a compressed air passage 16 which forms a nozzle opening 15 and extends substantially straight, an opening and closing valve 17 which extends in the compressed air passage 16 and performs control to open and close the nozzle opening 15, an actuator 18 for driving electromagnetically the opening and closing valve 17, a compressed air passage 19 which is branched off from the compressed air passage 16, and a fuel supply device 20 which supplies fuel to the inside of the compressed air passage 19. The compressed air passage 19 is connected to an engine driven air pump 21, so the compressed air passages 16 and 19 are filled with compressed air. The actuator 18 and the fuel supply device 20 are controlled by an electronic control unit 30 based on the output signals of an air flow meter 31 and a crank angle sensor 32.

Referring to FIG. 2, the air blast valve 14 is disposed so as to inject fuel along an axial line of injection K parallel with the vertical plane P passing through the centers $O_1$ and $O_2$ of an intake valve 6 and exhaust valve 7 disposed on opposing sides of a masking wall 8a. The axial line of injection K is made to pass through the true center of the pair of intake valves 6 and the spark plug 10. Further, as shown in FIG. 6, the axial line of injection K is made so as to be substantially parallel to the cylinder head inner wall surface portion 3c.

Figure 5:
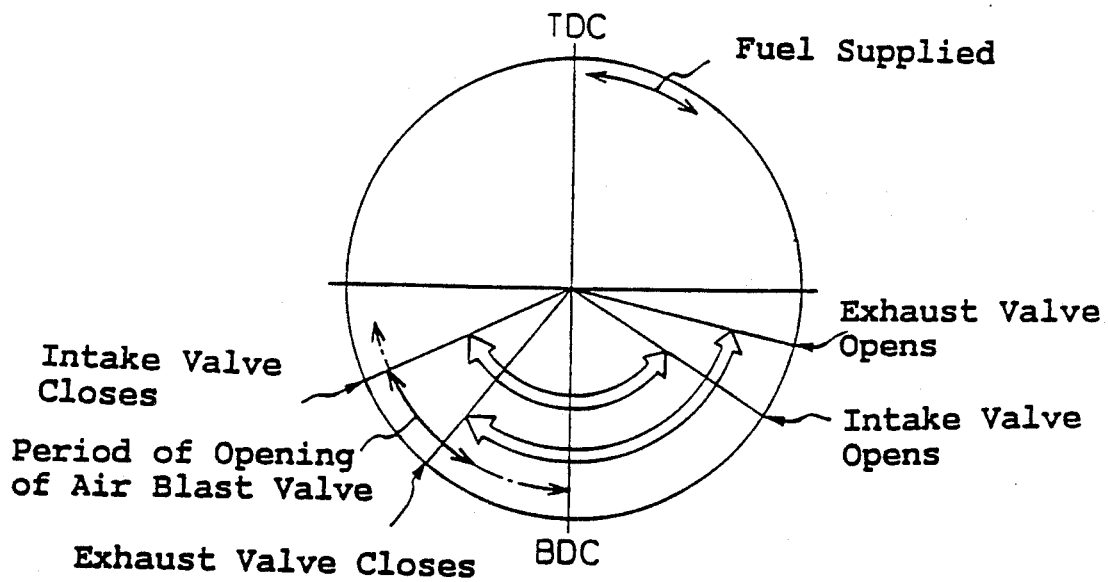
FIG. 5 is a graph of the opening period etc. of the intake and exhaust valves and an air blast valve.

FIG. 5 shows the opening period of the intake valves 6 and exhaust valves 7 and the opening period of the air blast valve 14. As shown in FIG. 5, the exhaust valves 7 open before the intake valves 6, and the exhaust valves 7 close before the intake valves 6. Further, fuel is supplied from the fuel supply device 20 toward the inside of the compressed air passage 19 to just after top dead center. The opening and closing valve 17, that is, the air blast valve 14, is opened a little before bottom dead center is passed and the exhaust valves 7 close. At this time, the fuel is injected into the combustion chamber 4 along with the compressed air.

Figure 6:
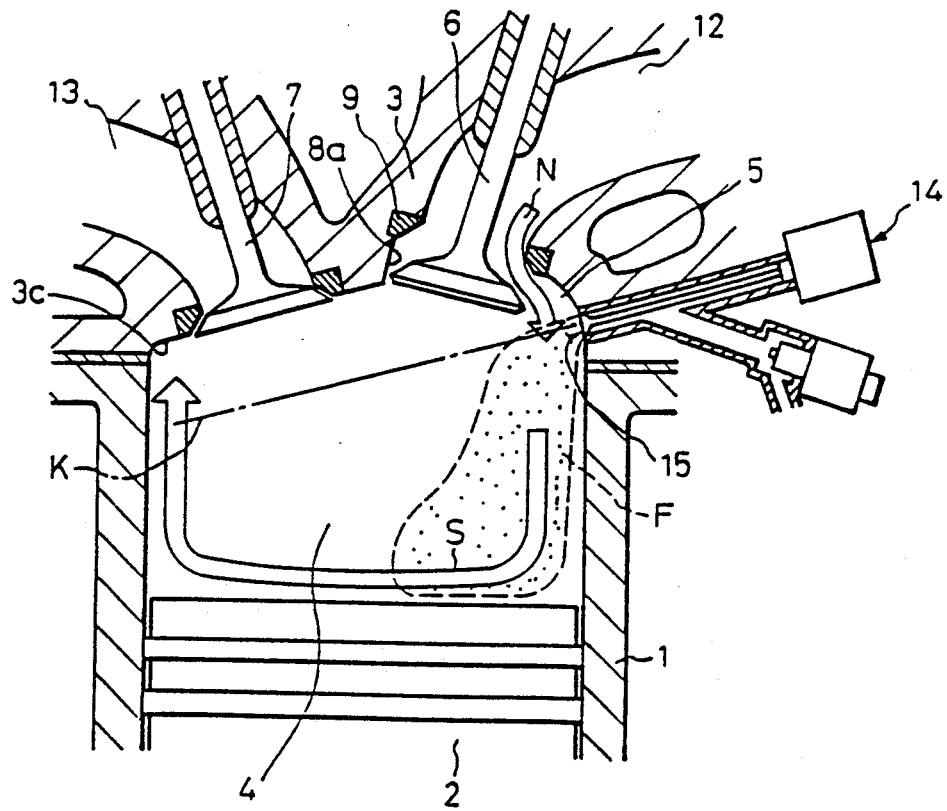
FIG. 6 is a view of the state of fuel atomization in a combustion chamber.

Referring to FIG. 6, when the piston 2 descends and the exhaust valves 7 open, the high pressure spent gas in the combustion chamber 4 rapidly flows out into the exhaust ports 13 and the pressure in the combustion chamber 4 drops dramatically. Next, when the intake valves 6 open, fresh air flows into the combustion chamber 4 from the intake ports 12, but since the masking walls 8a are provided for the openings of the intake valves 6, substantially the entire fresh air flows into the combustion chamber 4 from the opening of the intake valves 6 at the side opposite to the masking walls 8a as shown by the arrow N. Next, the fresh air descends along the cylinder inner wall surface under the intake valves 6 as shown by the arrow S, then cuts across the top surface of the piston 2 along the top surface of the piston 2, then rises along the cylinder inner wall surface under the exhaust valves 7. During this time, the spent gas in the combustion chamber 4 is gradually driven out by the flow of fresh air S. When bottom dead center is passed and the amount of lift of the exhaust valves 7 becomes smaller, the flow of fresh air rising along the cylinder inner wall surface downstream of the exhaust valves 7 heads toward the direction of the intake valves 6 along the cylinder head inner wall surface portion 3c where the exhaust valves 7 are disposed. Therefore, a swirling flow is created in the combustion chamber 4 by the fresh air around the axial line forming a right angle with the axial line of the cylinder, with high temperature spent gas collecting at the center portion of the swirling fresh air, that is, the center of the combustion chamber 4. Next, the fuel is injected together with compressed air from the nozzle opening 15 of the air blast valve 14.

However, as shown in FIG. 6, the nozzle opening 15 of the air blast valve 14 is disposed facing downward with the axial line of injection K oriented toward the upper space of the combustion chamber 4, and atomized fuel being injected from the nozzle opening 15 along the axial line of injection K with a certain angle of spread. When the fuel is injected together with compressed air from the nozzle opening 15 of the air blast valve 14, as shown by F in FIG. 6, the atomized fuel is deflected by the flow of fresh air N flowing in from the opening of the intake valves 6 to the combustion chamber 4 so as to head to the bottom portion of the combustion chamber 4. At this time, the flow of fresh air N flows substantially perpendicularly to the axial line of injection K, so the atomization of the injected fuel is promoted. This injected fuel is dispersed in the combustion chamber 4 by the flow of fresh air S, is mixed well with the high temperature spent gas, and thus is improved in fuel vaporization. Next, the exhaust valves 7 close, but fresh air continues to flow in from the opening of the intake valves 6 and therefore a strong swirling flow continues to be created, so the injected fuel is dispersed in the combustion chamber 4 and improved in atomization in the same way as mentioned earlier. Further, the injected fuel is deflected toward the bottom portion of the combustion chamber 4 by the flow of fresh air heading along the cylinder head inner surface portion 3c at which the exhaust valves 7 are disposed in the direction of the intake valves 6.

Next, the air blast valve 14 is closed, the injection of air and fuel from the nozzle opening 15 to the combustion chamber 4 is stopped, and then the intake valves 6 are closed.

According to the present embodiment, fuel is injected from the air blast valve 14 to the combustion chamber 4 when the intake valves 6 are opened, so the injected fuel is improved in atomization and is deflected toward the bottom portion of the combustion chamber 4 by the flow of fresh air flowing in from the opening of the intake valves 6. Therefore, the injected fuel is dispersed in the combustion chamber 4 by the flow of fresh air S, is brought into contact with and mixed with the high temperature spent gas, and is improved in fuel vaporization by the high temperature spent gas. As a result, the fuel is easily ignited and excellent combustion is performed after the ignition. Further, since the atomized fuel F is bent downward by the flow of fresh air S in this way, there is no blowby of the fuel in the exhaust ports 13 even if the timing of the start of opening of the air blast valve 14 is made earlier than the closing of the exhaust valves 7.

Note that in the present embodiment, the air blast valve 14 is made to close before the intake valves 6 close, but as shown by the dotted line in FIG. 5, the air blast valve 14 may be made to close after the intake valves 6 close. In this case, for a while after the intake valves 6 close, the powerful swirling flow continues to be caused in the combustion chamber 4. Therefore, the injected fuel is deflected toward the bottom portion of the combustion chamber 4 by the flow of air heading toward the intake valves 6 along the cylinder head inner wall surface portion 3c where the exhaust valves 7 are arranged and is further dispersed in the combustion chamber 4 by the flow of air S heading downward along the cylinder inner wall surface under the intake valves 6. Therefore, for a while after the intake valves 6 close, the fuel injected in the combustion chamber 4 is dispersed in the combustion chamber and improved in atomization and vaporization.

Further, the timing of opening of the air blast valve 14 may be advanced in the range where the fuel does not blowby the exhaust ports 13. For example, as shown by the dot-chain line in FIG. 5, the air blast valve 14 may be made to open directly after bottom dead center.

Further, the timing of opening of the air blast valve 14 may be made after the closing of the exhaust valves 7.

Further, the timing of opening of the air blast valve 14 may be fixed as shown in FIG. 5, but it may also be changed in accordance with the state of engine operation, for example, the engine speed or engine load.

Next, an explanation will be made of a second embodiment. In the second embodiment, portions the same as the first embodiment are shown by the same reference numerals and explanations of the same are omitted.

Figure 8:
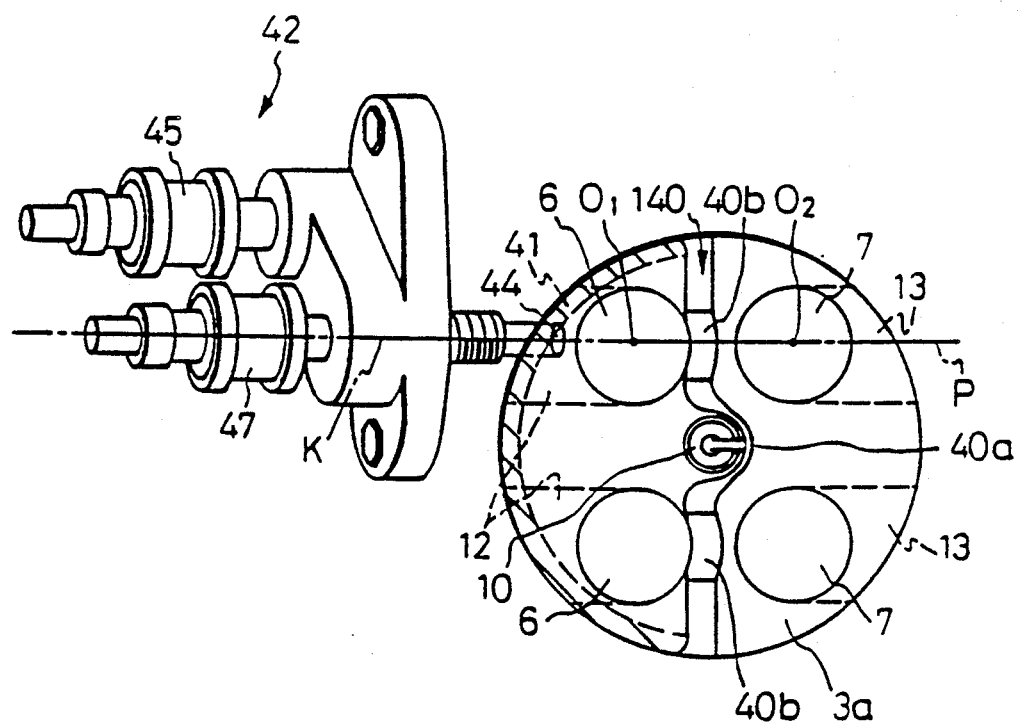
FIG. 8 is a view showing the cylinder head inner wall surface of FIG. 7.
Figure 9:
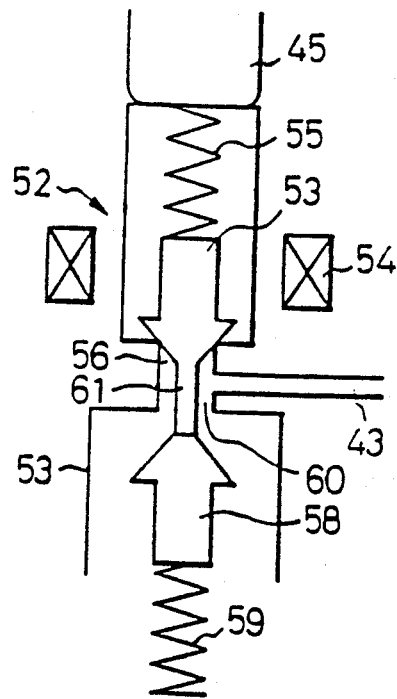
FIG. 9 and FIG. 10 are schematic views of a switching valve.

Referring to FIG. 7 and FIG. 8, there is formed on the inner wall surface 3a of the cylinder head 3 a projecting wall 40 which projects out toward the combustion chamber 4 and extends along the diameter of the inner wall 3a of the cylinder head 4 over the entire diameter thereof. Further, the center portion 40a of the projecting wall 40 is bent to the exhaust valve 7 side, and a spark plug 10 is arranged at the intake valve 6 side of the curved center portion 40a. Therefore, the spark plug 10 is positioned substantially on the axial line of the cylinder and further is arranged at the intake valve 6 side of the projecting wall 40. The projecting wall 40 has formed thereon masking walls 40b corresponding to the intake valves 6 so as to cover the openings between the peripheral edges of the intake valves and the valve seats positioned at the exhaust valve 7 side. These masking walls 40b are disposed extremely close to the peripheral edges of the corresponding intake valves 6 and form sectional arcs extending along the peripheral edges of the intake valves 6. Further, the masking walls 40b extend toward the combustion chamber 4 further downward from the intake valves 6 at the maximum lift position. Therefore, the opening between the peripheral edges of the intake valves 6 and the valve seats 9 positioned at the exhaust valve 7 side is closed by the masking walls 40 during the entire period of opening of the intake valves 6.

An air blast valve 42 is disposed at the peripheral side portion 41 (hatched portion of FIG. 8) of the cylinder head inner wall surface 3a under the pair of intake valves 6. In the air blast valve 42 is formed a compressed air passage 43. At one end of the compressed air passage 43 is formed the nozzle opening 44 and at the other end is provided a compressed air supply device 45 which supplies compressed air in the compressed air passage 43. At the nozzle opening 44 is disposed an automatic valve 46 which is continuously spring biased in the direction of valve closure. This automatic valve 46 is displaced toward the outside by the pressure of the compressed air when compressed air is supplied in the compressed air passage 43 from the compressed air supply device 45 and thus opens the nozzle opening 44. An injection port 48 of the fuel supply device 47 is arranged in the middle of the compressed air passage 43. The compressed air supply device 45 and the fuel supply device 47 are connected at one end to a compressed air supply passage 50 and fuel supply passage 51 formed in a delivery pipe 49. When compressed air is supplied from the compressed air supply device 45 to the compressed air passage 43, the nozzle opening 44 is opened, whereby fuel prefed from the fuel supply device 47 to the compressed air passage 43 is injected from the nozzle opening 44 to the combustion chamber 4. In the compressed air passage 43 near the compressed air supply device 43 is provided a switching valve 52 which selectively connects the compressed air passage 43 to the compressed air supply device 45 or a pipe 53 open to the atmosphere.

FIG. 7 is a schematic view of the construction of the switching valve 52. The switching valve 52 has a first valve body 53 which is integral with the armature and a solenoid coil 54 provided wound around a valve element 53. The first valve element 53 is pushed and biased to a first port 56 by a spring 55. In a pipe 53 opened to the atmosphere is arranged a second valve element 58 which opens and closes a second port 60. This second valve element 58 is biased toward the second port 60 by a spring 59. At the front end of the first valve element 53 is formed an extension 61 which extends in the direction of the second valve element 58. During the off period of the solenoid coil 54, the first valve element 53 closes the first port 56. At this time, the second valve element 58 is pushed down against the elastic force of the spring 59 by the extension 61 of the first valve element 53 and the second port 60 is opened. Therefore, before the fuel is injected, the compressed air passage 43 is at atmospheric pressure, so it is possible to ensure precision metering out of fuel.

Figure 10:
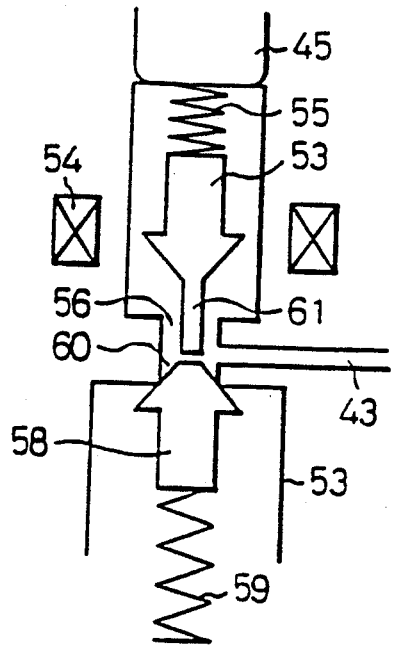

When the solenoid coil 54 is turned on, as shown in FIG. 10, the first valve element 53 is pulled up and the first port 56 is opened. At this time, the engagement of the second valve element 58 and the extension 61 of the first valve element 53 is released and the second valve element 58 closes the second port 60. Therefore, the compressed air supply device 45 is communicated with the compressed air passage 43.

Referring to FIG. 8, the air blast valve 42 is disposed so as to inject fuel along the axial line of injection K contained in a vertical plane passing through the center $O_1$ of an intake valve 6 and the center $O_2$ of an exhaust valve 7 disposed on the opposite side of a masking wall 40b from that intake valve 6.

Referring to FIG. 7, the air blast valve 42 is disposed under the intake port 12. The fuel is injected downward toward the upper space of the combustion chamber 4 from the nozzle opening 44 of the air blast valve 42.

FIG. 11 shows the timing of fuel injection during a low load operation. During a low load operation, the fuel injection from the nozzle opening 44 to the combustion chamber 4 is started simultaneously with the closing of the intake valves. By this, as shown in FIG. 12, the fuel is injected toward the upper space in the combustion chamber 4 and a rich air-fuel mixture may be distributed near the spark plug 11. Therefore, even during a low load operation, the ignition of the air-fuel mixture becomes excellent and the combustion stable.

On the other hand, during high load operation, as shown in FIG. 13, fuel is injected from the nozzle opening 44 to the combustion chamber 4 after the exhaust valves 7 close and during the period of opening of the intake valves 6. This case is the same as the first embodiment. That is, as shown in FIG. 14, the injected fuel is improved in atomization and deflected toward the bottom portion of the combustion chamber 4 by the flow of fresh air flowing in from the openings of the intake valves 6. Therefore, the injected fuel is dispersed in the combustion chamber 4 by the flow of fresh air, is brought into contact with and mixed with the high temperature spent gas, and is improved in vaporization by the high temperature spent gas. As a result, the fuel is easily ignited and excellent combustion is performed after the ignition.

Figure 15:
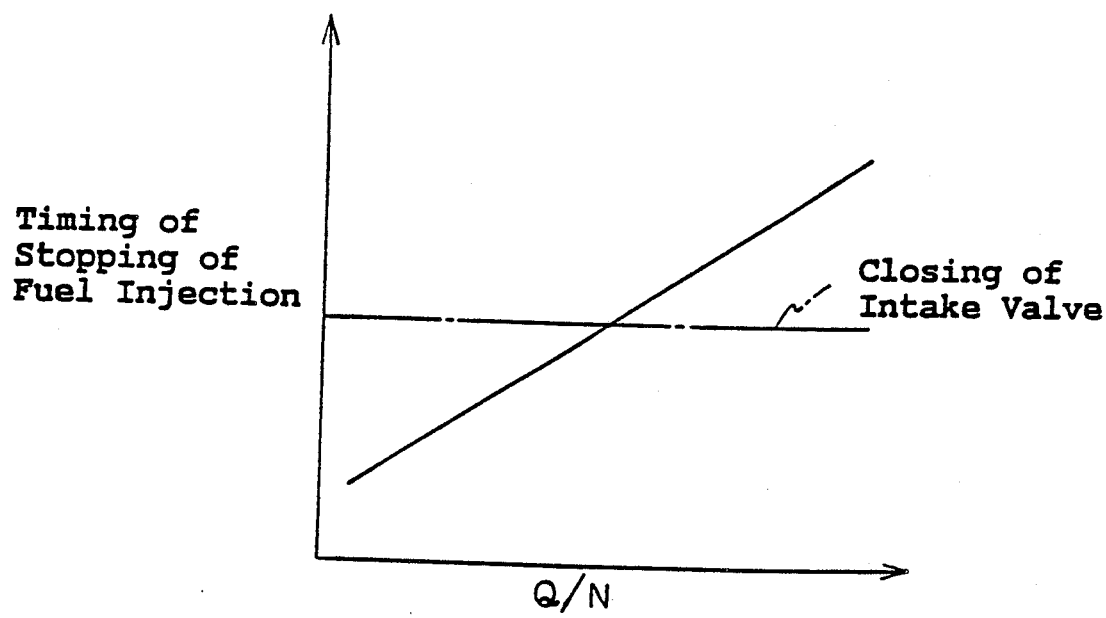
FIG. 15 is a graph of the relationship between the load and the timing when the fuel injection is stopped.

The above control of the timing of fuel injection is executed by an electronic control unit 30. The fuel injection timing is controlled, for example, as shown in FIG. 15. Q/N corresponds to the load of the engine and is the ratio of the amount of intake air Q and the engine speed N. The vertical axis shows the timing of the stopping of the fuel injection by the crank angle measured counterclockwise from top dead center in FIG. 11 or FIG. 13. According to the figures, the larger the Q/N, the greater the crank angle of the timing of stopping of the fuel injection.

Note that in the present embodiment, the nozzle opening 44 of the fuel injection valve 42 is disposed on the axial line of injection K, but it may also be disposed on the peripheral edge 41 of the cylinder head inner wall surface 3a at the intake valve 6 side.

Further, in the present embodiment, the timing of fuel injection from the fuel injection valve was changed by just the load, but the timing of fuel injection may be changed by the load and the engine speed as well. For example, it is possible to inject the fuel after the intake valves close in the case of low load and low speed and to inject the fuel after the exhaust valves close and during the period of opening of the intake valves in the case of high load and high speed.

Further, use may be made of any type of fuel injection valve which injects fuel by various methods instead of an air blast valve.

I claim:

1. A two-stroke internal combustion engine provided with a piston which moves reciprocatively in a cylinder, a cylinder head which has an inner wall surface, at least one intake valve which is arranged on a cylinder head inner wall surface, at least one exhaust valve which is arranged on the cylinder head inner wall surface, a masking means which is arranged between the intake valve and the exhaust valve to close off a portion of the opening toward the exhaust valve that exists between the peripheral edge of the intake valve and a valve seat when the intake valve is open, a fuel injection means which is arranged at the peripheral side portion of the cylinder head inner wall of the intake valve side, and a control means which controls the fuel injection from the fuel injection means to the cylinder, the control means starting the fuel injection from the fuel injection means to the cylinder when the intake valve is opening.

2. A two-stroke internal combustion engine according to claim 1, wherein said fuel injection means is disposed so as to inject fuel along an axial line of injection which is parallel to a substantially vertical plane passing through the center of said intake valve and the center of said exhaust valve disposed at opposite sides of said masking means.

3. The two-stroke internal combustion engine according to claim 2, which has a pair of intake valves disposed at the same side of said masking means and a pair of exhaust valves disposed at the side of said masking means opposite to the pair of said intake valves, said axial line of injection passing between and equidistant from a center of each of said pair of intake valves at each point along said axial line.

4. A two-stroke internal combustion engine according to claim 2, which has a pair of intake valves disposed at the same side of said masking means and a pair of exhaust valves disposed at the side of said masking means opposite to the pair of said intake valves, said axial line of injection passing through the center of one of said pair of intake valves.

5. A two-stroke internal combustion engine according to claim 1, wherein said fuel injection means is disposed so as to inject the fuel downward toward an upper space in said cylinder.

6. A two-stroke internal combustion engine according to claim 1, wherein said fuel injection means is provided with a compressed air passage having a nozzle opening at one end thereof, a fuel supply device for supplying fuel inside said compressed air passage, and a valve element for opening and closing said nozzle opening, the fuel supplied from said fuel supply device to said compressed air passage being injected from said nozzle opening to said cylinder by compressed air.

7. A two-stroke internal combustion engine according to claim 6, wherein said compressed air passage is filled with compressed air at all times and said nozzle opening is opened and closed by the valve element which is driven electromagnetically.

8. A two-stroke internal combustion engine according to claim 6, wherein said fuel injection means is provided with a compressed air supply device which supplies compressed air in said compressed air passage when injecting fuel from said nozzle opening to said cylinder and said valve element opens said nozzle opening by pressure of compressed air supplied in said compressed air passage.

9. A two-stroke internal combustion engine according to claim 1, wherein said exhaust valve opens before said intake valve opens, and closes before said intake valve closes.

10. A two-stroke internal combustion engine according to claim 9, wherein said control means starts the fuel injection from said fuel injection means to the said cylinder before said exhaust valve closes.

11. A two-stroke internal combustion engine according to claim 9, wherein said control means stops the fuel injection from said fuel injection means to said cylinder after said intake valve closes.

12. A two-stroke internal combustion engine according to claim 9, wherein said control means stops the fuel injection from said fuel injection means to said cylinder before said intake valve closes.

13. A two-stroke internal combustion engine according to claim 9, further provided with a low load control means which, during low load engine operation, prohibits control of said fuel injection means by said control means and causes injection of fuel from said fuel injection means to said cylinder after said intake valve closes.

14. A two-stroke internal combustion engine according to claim 1, wherein said masking means is disposed near to said intake valve peripheral edge and has a masking wall which extends toward said piston to lower than said intake valve in the maximum lift position.

15. A two-stroke internal combustion engine according to claim 14, wherein said masking wall extends in an arc along said intake valve peripheral edge portion.

16. A two-stroke internal combustion engine according to claim 14, wherein said cylinder head inner wall surface has a groove and is provided with a substantially flat inner wall surface portion other than said groove, a bottom wall of the groove, and a groove peripheral wall positioned between said inner wall surface portion and bottom wall, said exhaust valve is positioned on said inner wall surface portion, and said masking wall is formed on said peripheral wall.

17. A two-stroke internal combustion engine according to claim 16, wherein said groove peripheral wall extends through the two end portions of the peripheral wall of the cylinder head inner wall surface and said peripheral wall portion other than said masking wall forms a fresh air guide wall which extends downward toward the piston.

18. A two-stroke internal combustion engine according to claim 16, provided with a spark plug disposed on said inner wall surface portion at the substantial center of the inner wall surface of the cylinder head.

* * * * *